Figure 1:
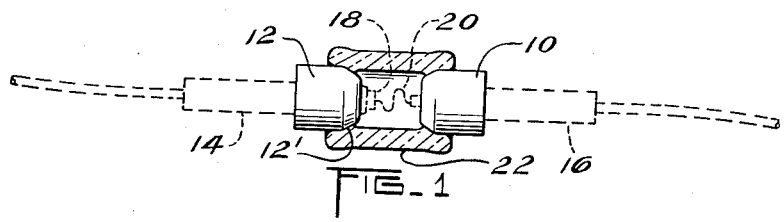

Dec. 21, 1954     P. E. GATES     2,697,309
METHOD OF MAKING TUBULAR GLASS-TO-METAL SEALS
Filed April 5, 1949

INVENTOR.
Paul E. Gates
BY
ATTORNEY

United States Patent Office 2,697,309
Patented Dec. 21, 1954

2,697,309

METHOD OF MAKING TUBULAR GLASS-TO-METAL SEALS

Paul E. Gates, Danvers, Mass., assignor to Sylvania Electric Products Inc., a corporation of Massachusetts Application April 5, 1949, Serial No. 85,518

7 Claims. (Cl. 49—81)

The present invention relates to methods of manufacturing composite articles of glass and metal, especially of glass and metal tubing sealed coaxially together.

Copending application Serial No. 74,768 filed February 5, 1949, by Ralph B. Collins, Jr., discloses a cartridge or capsule having a short length of insulating tubing as of glass hermetically sealed at both ends to metal sleeves. The present invention provides a simple and reliable procedure for forming glass-walled capsules with metal sleeves at its ends, suitable for reception of rods that support a crystal and a cat whisker within the capsule as in the Collins application. In a broader sense, the present invention provides novel structures and sealing procedures for joining together coaxially and hermetically a glass tube and a metal fitting.

In accordance with the present invention the glass tube and a metal sleeve are assembled coaxially, a tapered end of the sleeve having its reduced end projecting into a glass tube and having an enlarged portion engaging the end of the glass tube interiorly. In a sequence of heating steps the end of the glass tube is softened while endwise pressure is applied, to form the glass about the sleeve and then to form a seal. With sleeve tapers of approximately 10° to 30° and glass tubing of proper bore diameter, uniform and reliable seals are made without danger of the glass wetting the inner ends of the sleeves. This avoids the possibility of obstruction of the sleeve bore. The fabrication of a capsule requiring two sleeves is simply and expeditiously accomplished in like manner, the tapered surfaces of two sleeves being assembled coaxially with the glass, and sealed in a single sequence of operations that avoid separate handling of the sleeves and the glass in making the two glass-to-metal seals. The term "glass" is used here in its generic sense to cover like vitreous materials.

The following detailed specific disclosure is illustrative of the invention as applied to cartridge-fabrication for a crystal diode. Other modifications and applications of the various features of the present invention will occur to those skilled in the art. Accordingly the features of the invention pointed out in the appended claims should be allowed such broad interpretation as is consistent with the spirit and scope of the invention. In the drawings:

Fig. 1 is a view of a capsule or cartridge in longitudinal cross-section, with additional portions of a diode to be later assembled shown in dotted lines, all greatly enlarged;

Figs. 2 to 7 inclusive are longitudinal cross sections of the capsule in various stages of completion.

The manufacture of the cartridge in Fig. 1 has many latent problems that are solved, in part, by the shape of the metal sleeves as illustrated and by the relative diameters of the sleeves and the glass tube. It is desired that the sleeves 10 and 12 should be coaxial or at least having parallel axes so as to direct rods 14 and 16 toward each other and establish mutually perpendicular contact between crystal 18 and cat whisker 20. The glass tubing 22 enclosing crystal 18 and cat whisker 20 is fused at its ends to sleeves 10 and 12; but is of substantially undistorted tubular form at its central region. The inner diameter of tubing 22 is seen to be larger than the end face of sleeves 10 and 12, but of smaller diameter than the external portions of those sleeves. Between the end face and the lateral cylindrical exterior of sleeve 12 (and of sleeve 10 as well) there is seen to be a conical tapered portion 12'. This cone has an included angle of 25° between the cylindrical surface and the conical surface; but angles of 10° to 30° will be found effective for the purposes of this invention.

The assembly of Fig. 1 is produced in a sequence of steps that may advantageously be carried out in a machine having multiple rotary spindles on a revolving turret, carried through a loading zone, a sequence of heating stations, and an unloading zone. The capsule, having metal sleeves at both ends, is completed quickly and uniformly in a single pass through the machine. The assembly lends itself to ideally simple form of the mandrel, carried on spindles, that is at once inexpensive and reliable.

Figure 2:
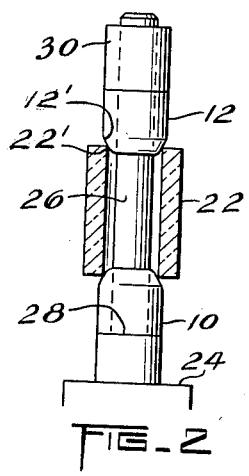

In Fig. 2 a mandrel 24 is shown having a rod 26 extending upward from a shoulder 28 that is to support the parts assembly at a predetermined level in the machine, and to maintain the assembled parts (in various degrees of completion) so as to produce capsules of uniform length with coaxial bores at its ends for receiving the remainder of the diode assembly. The parts are shown just as they appear when loaded onto the mandrel. Sleeves 10 and 12 are loaded onto rods 26 of the mandrel with glass tubing 22 between them. Inner edge 22' of the end of tube 22 contacts an intermediate zone about the tapered surface 12'. A weight 30 is slipped over the top of the mandrel for applying endwise pressure to the assembly during the heating operations.

Figure 3:
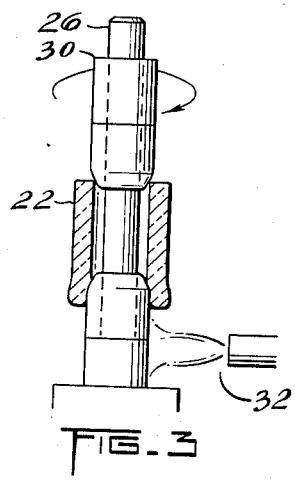

The parts are assembled either automatically or manually in a loading zone, after which the mandrel enters processing zones shown in Figs. 3 to 7 inclusive. The several mandrels are carried from station to station stepwise, the mandrel axes being maintained vertical. In Fig. 3 the lower end of glass tubing 22 is shown softened and formed about sleeve 10, but not yet hermetically sealed to it. This softening is effected by a burner 32 which is directed against the shoulder portion 28 of the mandrel and against the sleeve 10 itself, while the mandrel is continuously rotated. Weight 30 will be observed to have descended somewhat along mandrel 26. The extent of descent is controlled by the time that the mandrel is retained opposite burner 32, and the adjustment of the burner. After adjustment once, the successive capsules are reproduced uniformly.

Figure 4:
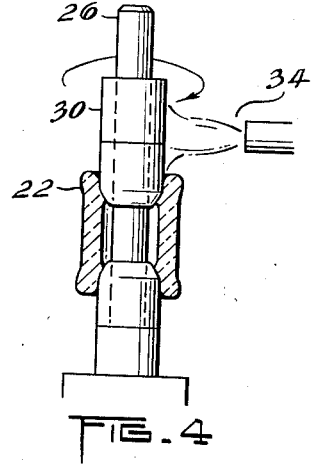
Figure 5:
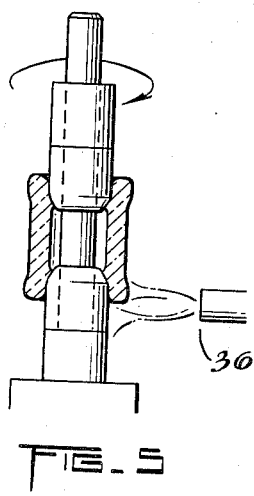
Figure 6:
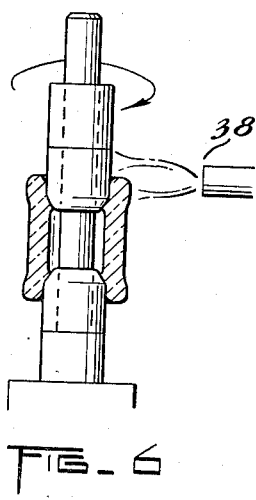
Figure 7:
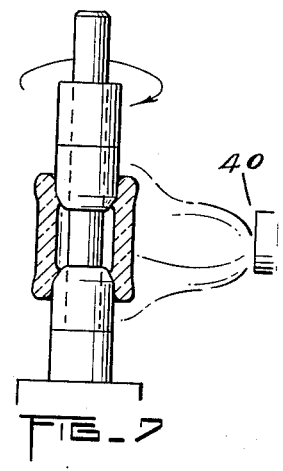

In Fig. 4 the same effect as in Fig. 3 is shown to have occurred at the opposite end of the capsule, glass tubing 22 being softened at its upper end to flow about sleeve 12, that has not yet been sealed to the sleeve at this stage. Weight 30 has descended further along rod 26. In Figs. 5 and 6, respectively, pointed flames of intense heat from burners 36 and 38 are played against the edges of the glass where they are in contact with sleeves 10 and 12, the flames also bearing on those sleeves so as to promote a quick seal in which a very minimum of further deformation of the glass tube takes place. Finally, the glass is annealed by flame 40 in Fig. 7, and is ready to be unloaded.

The sleeve taper, optimally 25°, has been found to be of great importance in achieving the desired results. It is seen in Fig. 2 that the inner edge of the glass contacts this tapered or conical surface. Were the taper 35° or blunter there would be a tendency of the glass to spread not about the sleeve itself, but to flare away from the sleeve and make the subsequent formation of a glass-to-metal seal difficult if not impossible. A taper much more gradual than the recommended 25° would tend to increase the axial dimensions of the cartridge; and would require unduly critical control of the burners in order to achieve uniform over-all length of the cartridge. That the inner edge of the end of the glass tubing contacts the tapered edge is of importance; for if contact between the glass and the sleeve were made at the flat end of that sleeve, there would be a serious tendency of the glass to flow radially inward toward mandrel 26 and then to form an obstruction in the paths of rods 14 and 16 during subsequent assembly operations. Using the components described, and the sequence of operations illustrated, it is readily possible to produce cartridges of uniform axial dimensions and with aligned bores in the metal sleeves.

That the glass has not flared away from the sleeve and that a reliable hermetic seal has been produced can readily be detected by observation. If the glass about the inner end of either sleeve is white, then the glass has spread away from that sleeve and there is no hermetic seal;

whereas if the seal is gray or possibly even black, a good seal has been produced.

The metal used is to be selected in relation to the type of vitreous material used. For example, the alloy described in the Kingston Patent Number 2,394,919 issued February 12, 1946, will be found to be useful with tubing of commercial soft glass, this alloy having substantially the same thermal coefficient of expansion as that of the glass and being readily capable of oxidation to provide the right type of surface for forming a good glass-to-metal seal. Hard glass having a high melting temperature and a different thermal coefficient of expansion should be used with other alloys selected for proper glass-to-metal sealing characteristics and thermal coefficients of expansion.

The foregoing embodiment of the invention is evidently susceptible to varied modifications in detail. Thus it would be possible to provide a second reduced dimension in mandrel 26 to provide another shoulder limiting the descent of the upper sleeve, the bore in that sleeve being correspondingly smaller. It has been found however that this is an unnecessary complication. With proper control of the flames (without becoming extremely critical) remarkably uniform cartridges are readily and expeditiously produced by the illustrative method. Other modifications in detail and diverse application of the invention will naturally occur to those skilled in the art; consequently the appended claims should be allowed due latitude of interpretation.

What is claimed is:

1. The method of sealing a pair of metal sleeves to the ends of a short glass tube which comprises the steps of providing sleeves having tapered ends, inserting the smaller end of each sleeve into the opposite ends of the glass tube with the inner edges of the ends of the glass tube in circumferential contact with the tapered portion of each sleeve, holding said sleeves in coaxial alignment, the tapered sleeves serving to align the glass tube coaxially with those sleeves, and heat-softening the ends of the glass tube to form fused seals to the sleeves.

2. The method of sealing metal sleeves to the ends of a short glass tube, comprising the steps of assembling a pair of metal sleeves at the ends of a short glass tube in coaxial alignment, the outer diameter of the sleeves being between the inner and outer diameters of the glass tube and the sleeves having tapered ends projecting into the bore of the glass tube, applying endwise pressure to the assembly, and successively heat-sealing the ends of the glass tube to the metal sleeves.

3. The method of forming a cartridge having a glass wall and tubular metal ends, comprising the steps of assembling a pair of metal sleeves coaxially with each other in endwise alignment with a glass tube and with ends of the sleeves having external surfaces tapered at approximately 25° in contact with the inner end portions of the tube, the contact of the tapered surfaces of the sleeves serving to align the glass tube coaxially with those sleeves, heat-softening the ends of the tube moderately while maintaining such coaxial alignment and applying endwise pressure to the assembly, thereby to cause flaring of the glass tube along the sleeves, and then heating the glass ends intensely to form hermetic seals to the metal sleeves.

4. The method of sealing a pair of metal sleeves to the ends of a short glass tube which comprises the steps of providing sleeves each having an externally tapered end and a cylindrical bore, assembling the sleeves coaxially on a mandrel with the tapered end of each sleeve projecting into a respective end of a glass tube and with the inner edges of the ends of the glass tube in circumferential contact with the tapered portion of each sleeve, the glass tube thereby being automatically aligned coaxially with both sleeves, and heat-softening the ends of the glass tube to form fused seals to the sleeves.

5. The method of sealing cylindrically bored metal sleeves to the ends of a short glass tube, comprising the steps of assembling the sleeves on a mandrel coaxially with each other and separated by a short glass tube, the sleeves having externally tapered portions projecting into opposite ends of the bore of the glass tube which is thereby automatically aligned coaxially with the sleeves, and heat-sealing the ends of the glass tube to the sleeves.

6. The method of sealing metal tubes to the ends of a short glass tube including the steps of providing metal tubes with cylindrical bores and externally tapered ends, assembling the metal tubes coaxially on a mandrel with a glass tube interposed between the metal tubes, the tapered ends projecting part-way into the opposite ends of the bore of the glass tube which is thereby automatically aligned coaxially with the sleeve, and heat-sealing the ends of the glass tube to the metal tubes.

7. The method of sealing a pair of metal sleeves to the ends of a short glass tube, which comprises the steps of providing a short glass tube and a pair of metal sleeves, each sleeve having a cylindrical bore and having an end of reduced diameter less than the internal diameter of the short glass tube, and the sleeves further having a transition zone progressing to a portion of larger diameter greater than the internal diameter of the glass tube, assembling said sleeves coaxially by means coaxially engaging the cylindrical bores thereof, with the glass tube interposed between the sleeves and the reduced-diameter ends of said sleeves projecting into the respective ends of the glass tube, the ends of the glass tube being placed in circumferential engagement with the transition zones of both coaxial sleeves and thereby being held substantially coaxial with said sleeves, said sleeves further being retained separate from each other by engagement with the glass tube, and heat-softening the ends of the glass tube to form fused seals to the sleeves.

References Cited in the file of this patent

UNITED STATES PATENTS

| Number | Name | Date |
| --- | --- | --- |
| 2,048,556 | McArthur | July 21, 1936 |
| 2,167,482 | Hull et al. | July 25, 1939 |
| 2,271,657 | Miller | Feb. 3, 1942 |
| 2,386,820 | Spencer | Oct. 16, 1945 |
| 2,414,622 | Watrous, Jr. | Jan. 21, 1947 |
| 2,457,144 | Goodale | Dec. 28, 1948 |

FOREIGN PATENTS

| Number | Country | Date |
| --- | --- | --- |
| 616,065 | Great Britain | Jan. 17, 1949 |